Patented Nov. 18, 1924.

1,516,171

UNITED STATES PATENT OFFICE.

EMILE BAPTISTE GUSTAVE BASCOU, OF NEUILLY-SUR-SEINE, FRANCE.

PROCESS FOR AGGLOMERATING THE PRODUCTS AND RECOVERING THE OIL FROM PRODUCTS OBTAINED BY AGITATING PULVERIZED COAL WITH OIL IN WATER.

No Drawing.     Application filed April 26, 1923. Serial No. 634,923.

*To all whom it may concern:*

Be it known that I, EMILE BAPTISTE GUSTAVE BASCOU, citizen of the French Republic, residing 183 Avenue de Neuilly, Neuilly-sur-Seine, France, have invented certain new and useful Processes for Agglomerating the Products and Recovering the Oil from Products Obtained by Agitating Pulverized Coal with Oil in Water, of which the following is a specification.

Various known processes are in use, and chiefly the floating processes of Elmore, Latermoll, Trent and others, which are intended for the separation of certain substances such as coal, lignite or ores from their impurities. The said processes have certain points in common, consisting in the fact that the substances to be separated from their impurities are finely ground and are stirred in a bath of water which is mixed with a greater or less amount of oil. In some cases, and chiefly in the process described by W. E. Trent, there is produced a viscous substance composed of globules of oil formed around a nucleus consisting of fine particles of coal, lignite or ore; these globules can be brought together by a sufficiently energetic churning, thus producing a veritable butter. The invention which is set forth hereunder is intended for the recovery of the oil contained in such substances.

The only means hitherto known for the extraction of the oil from this "butter" consisted in distilling the substance. But the distillation process is expensive and complicated, and further, a portion of the oil is decomposed by the heat and is thus lost.

The present invention obviates these drawbacks by eliminating the distillation, and it has moreover the advantage of furnishing the treated and purified material in the shape of blocks or bricks when desired, without the addition of tar or like agglomerating substance, since the oil remaining in the product is sufficient to act as the binding material.

This invention consists in submitting to pressure, in a mould providing for the discharge of the oil, the substance obtained by the agglomeration, by churning, of the globules of oil formed around a core consisting of a particle of coal, lignite or pulverized ore.

I have also found that it was preferable in many cases to make use of the combined action of heat and pressure. Heating will diminish the viscosity of the oil so that it may separate from the solid substances under the effect of pressure which brings together the solid particles, and the oil thus becomes sufficiently fluid to flow from the apparatus. By using a suitable temperature and pressure I am thus enabled to recover the whole or substantially the whole of the oil contained in the product under treatment. According to the use which is to be made of this purified product, one can choose the temperature and pressure and the methods of applying the same, in such manner that the final product will be a strong agglomerate or a brittle mass.

The compression and the heating during the treatment may be simultaneous or successive, and may take place in any desired sequence.

Compression may be performed by means of known filter presses, and chiefly by the presses in use for making lignite bricks or blocks, and the oil can be discharged through apertures in the walls of the moulds or simply through the spaces between the compressing piston and the walls of the mould.

The mould can be heated by gas, steam or electricity, or by like means.

The application of the said process to a particular case is set forth hereunder by way of example.

Coal in the powdered state, which will pass through a sieve No. 200 (i. e. 200 meshes per square centimetre) is stirred for a few minutes with a mixture of water and oil (petroleum, fuel oil etc.) and the whole is filtered; the major part of the water and the impurities mixed with the coal will be thus eliminated, and a viscous substance composed of fine particles of coal agglomerated by oil will remain upon the filter.

In the process according to my invention the oil can be separated from the coal in this case by compressing and heating the mass, and in this manner when operating at 100 degrees C., 78 per cent of the oil used can be recovered at a pressure of 1 ton per square centimetre, 91 per cent at a pressure of 1 ton per square centimetre, 91 per cent at a pressure of 1.7 tons per square centimetre, and so on.

In some cases, as much as 97 per cent of the oil can be recovered by a suitable choice of temperature and pressure.

In addition to the oil recovered, one may obtain agglomerates of coal whose hardness will vary with the kind of coal which is used and with the pressure employed.

What I claim is:

1. In the purifying of the coal by grinding and stirring with a mixture of water and oil the coal and separating by filtering the viscous obtained substance composed of fine particles of coal agglomerated by oil, the method for obtaining agglomerates of coal and for recovering oil which comprises heating the said viscous substance submitting it to a high compression and separating the expressed liquids from the mass while under heat and compression.

2. In the purifying of the coal by grinding and stirring with a mixture of water and oil the coal and separating by filtering the viscous obtained substance composed of fine particles of coal agglomerated by oil, the method for obtaining agglomerates of coal and for recovering oil which comprises heating the said viscous substance to 100 degrees C., submitting it to a compression higher than 1 ton per square centimeter and separating the expressed liquids from the mass while under heat and compression.

3. In the purifying of the coal by grinding and stirring with a mixture of water and oil the coal and separating by filtering the viscous obtained substance composed of coal agglomerated by oil, the method for recovering the oil which comprises heating the said viscous substance submitting it to a very high compression and separating the expressed liquids from the mass while under heat and compression.

In witness whereof I have hereunto set my hand.

EMILE BAPTISTE GUSTAVE BASCOU.